United States Patent
Lee et al.

(10) Patent No.: US 6,989,951 B2
(45) Date of Patent: Jan. 24, 2006

(54) DISK WRITER AND WRITING METHOD THEREOF

(75) Inventors: Hyun-jin Lee, Suwon (KR); Tae-hwan Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 94 days.

(21) Appl. No.: 10/418,141

(22) Filed: Apr. 18, 2003

(65) Prior Publication Data

US 2004/0095665 A1 May 20, 2004

(30) Foreign Application Priority Data

Nov. 19, 2002 (KR) .................. 10-2002-0071925

(51) Int. Cl.
*G11B 5/09* (2006.01)
*G11B 21/02* (2006.01)

(52) U.S. Cl. .................................. 360/51; 360/75
(58) Field of Classification Search ............... 360/51, 360/75, 48, 77.05
See application file for complete search history.

(56) References Cited

U.S. PATENT DOCUMENTS

| | | | | |
|---|---|---|---|---|
| 5,894,374 A | * | 4/1999 | Moraru | 360/75 |
| 6,034,835 A | * | 3/2000 | Serrano | 360/77.05 |
| 6,172,836 B1 | | 1/2001 | Bang | |
| 6,256,164 B1 | * | 7/2001 | Choi | 360/97.01 |
| 6,396,654 B2 | * | 5/2002 | Jeong et al. | 360/77.08 |
| 6,424,486 B2 | | 7/2002 | Heaton et al. | |
| 6,587,293 B1 | * | 7/2003 | Ding et al. | 360/51 |
| 6,628,471 B1 | * | 9/2003 | Min et al. | 360/75 |
| 6,707,632 B1 | * | 3/2004 | Raphael et al. | 360/75 |
| 2002/0149867 A1 | * | 10/2002 | Dunn et al. | 360/51 |

FOREIGN PATENT DOCUMENTS

| | | |
|---|---|---|
| JP | 5-002728 | 1/1993 |
| JP | 8-138336 | 5/1996 |
| JP | 9-185877 | 7/1997 |
| JP | 11-260008 | 9/1999 |
| JP | 2001-344901 | 12/2001 |
| KR | 1996-7004302 | 8/1996 |
| KR | 1999-56098 | 7/1999 |
| KR | 2001-27998 | 4/2001 |
| KR | 2001-50729 | 6/2001 |
| KR | 2001-109082 | 12/2001 |

* cited by examiner

*Primary Examiner*—David Hudspeth
*Assistant Examiner*—Varsha A. Kapadia
(74) *Attorney, Agent, or Firm*—Staas & Halsey LLP

(57) ABSTRACT

A disk writer writing servo data on a disk for an HDD. The disk writer includes a reference signal writer writing a reference signal on the disk along a track at a predetermined distance from an edge of the disk; and a servo writer including a reference signal detector detecting the reference signal written on the disk and a writer writing the servo data on the disk on the basis of a position where the reference signal is detected. With this configuration, the present invention provides a disk writer and a writing method thereof, capable of minimizing a positioning error of a start track of an HDD.

14 Claims, 4 Drawing Sheets

DISK WRITER AND WRITING METHOD THEREOF

CROSS-REFERENCE TO RELATED APPLICATIONS

This application claims the benefit of Korean Application No. 2002-71925, filed Nov. 19, 2002, in the Korean Intellectual Property Office, the disclosure of which is incorporated herein by reference.

BACKGROUND OF THE INVENTION

1. Field of the Invention

The present invention relates to a disk writer and a writing method thereof, writing servo data on a disk forming a hard disk drive (HDD).

2. Description of the Related Art

Generally, a HDD is widely used as an auxiliary memory unit for a computer system. The HDD comprises a disk on which data is stored, and a head writing data on the disk and reading data stored on the disk.

The HDD writes data on and reads data from a predetermined track of the disk in response to reading and writing orders of the computer system.

To successively write and read data on and from the disk, there is needed servo data to control the head to move along target tracks of the disk. The servo data is written by a servo writer during a servo writing process when the HDD is manufactured.

There has been used a method of writing servo data on the disk, in which the servo data is written on each disk after one to three disks are assembled. However, as the HDD recently has been becoming high in density and large in capacity, this method takes much time and needs many servo writers, so that it is not suited to present requirements. Therefore, there is proposed a method in which the servo data is written on a plurality of disks mounted to a rotation axle such as a hub before the disks are assembled. This method improves the productivity compared with the former method since the servo data is written on the plurality of disks at the same time.

On the other hand, both of the conventional servo-writing methods are in need of the servo writer.

As shown in FIG. 1, a conventional servo writer 130 comprises a servo head 131 to write the servo data on a disk 110, a servo writer arm 135 supporting the servo head 131, and a positioner 137 rotatably supporting the servo writer arm 135 and adjusting a position of the servo head 131.

With this configuration, a worker controls the positioner 137 with a jig or his/her eyes so as to position the servo head 131 on a start track 113 of the disk 110, at which the servo writing process is started. Then, the servo head 131 starts writing the servo data on the disk 110 at the start track 113.

However, in the conventional servo writer 130, the position of the start track 113 is likely to vary whenever the servo writing process is performed since the start track 113 is determined by the jig or an operator's eye. Further, the position of the start track 113 is likely to vary because of assembling or processing errors generated when the servo head 131 and the servo writer arm 135 are replaced with a new one. If such disks 110 are assembled within the HDD, the start track 113 of the disk 110 may be out of a predetermined moving range in which a head (not shown) of the HDD moves to seek the start track 113, so that the head of the HDD cannot read the start track 113, thereby causing a reading error in the HDD.

SUMMARY OF THE INVENTION

Accordingly, it is an aspect of the present invention to provide a disk writer and a writing method thereof, capable of minimizing a positioning error of a start track of an HDD.

Additional aspects and advantages of the invention will be set forth in part in the description which follows and, in part, will be obvious form the description, or may be learned by practice of the invention.

The foregoing and/or other aspects of the present invention are achieved by providing a disk writer writing servo data on a disk for an HDD, comprising: a reference signal writer writing a reference signal on the disk along a track at a predetermined distance from an edge of the disk; and a servo writer including a reference signal detector detecting the reference signal written on the disk and a writer writing the servo data on the disk on the basis of a position where the reference signal is detected.

According to an aspect of the invention, the reference signal writer includes a reference signal head writing the reference signal on the disk; and a reference head arm supporting the reference signal head stably in place.

According to another aspect of the invention, the servo writer includes a servo head provided with the reference signal detector and the writer; a servo writer arm supporting the servo head; and a positioner rotatably supporting the servo writer arm and adjusting a position of the servo head on the basis of the position where the reference signal is detected.

According to yet another aspect of the invention, the reference signal written on the disk includes a clock signal.

The foregoing and/or other aspects of the present invention may also be achieved by providing a method of writing servo data on a disk for an HDD, comprising: writing a reference signal on the disk along a track at a predetermined distance from an edge of the disk; detecting the reference signal written on the disk; and writing the servo data on the disk on the basis of a position where the reference signal is detected.

BRIEF DESCRIPTION OF THE DRAWINGS

These and/or other aspects and advantages of the present invention will become apparent and more readily appreciated from the following description of the embodiments, taken in conjunction with the accompany drawings of which.

DESCRIPTION OF THE PREFERRED EMBODIMENTS

Figure 1:
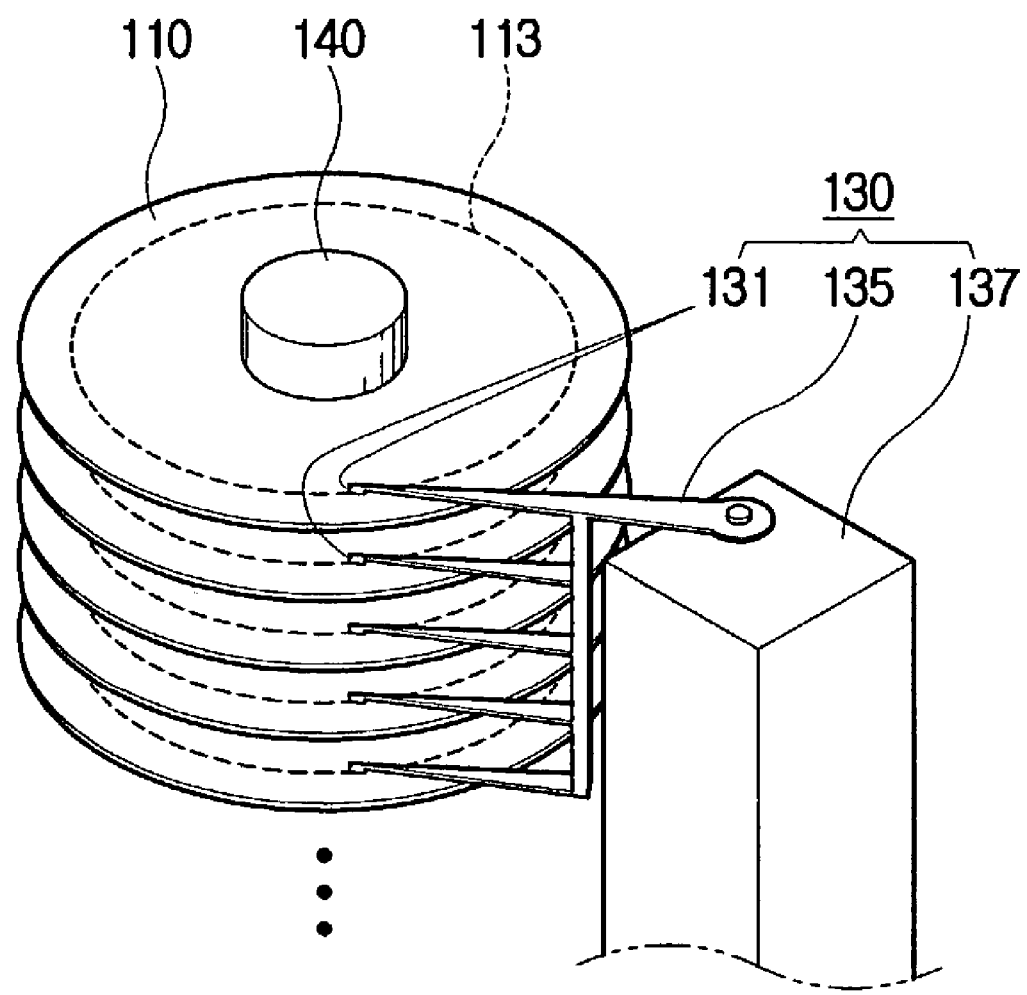
FIG. 1 is a schematic perspective view of a conventional disk writer.

Reference will now be made in detail to the embodiments of the present invention, examples of which are illustrated in the accompanying drawings, wherein like reference numerals refer to like elements throughout. The embodiments are described below in order to explain the present invention by referring to the figures.

Generally, as a method of writing servo data on a disk forming an HDD, the servo data is written on a plurality of disks mounted to a rotation axle such as a hub before the disks are assembled within a respective HDD. This method increases the productivity because the servo data is written on the plurality of disks at the same time.

Hereinafter, a disk writer writing the servo data on the plurality of disks at the same time will be described by way of example.

Figure 2:
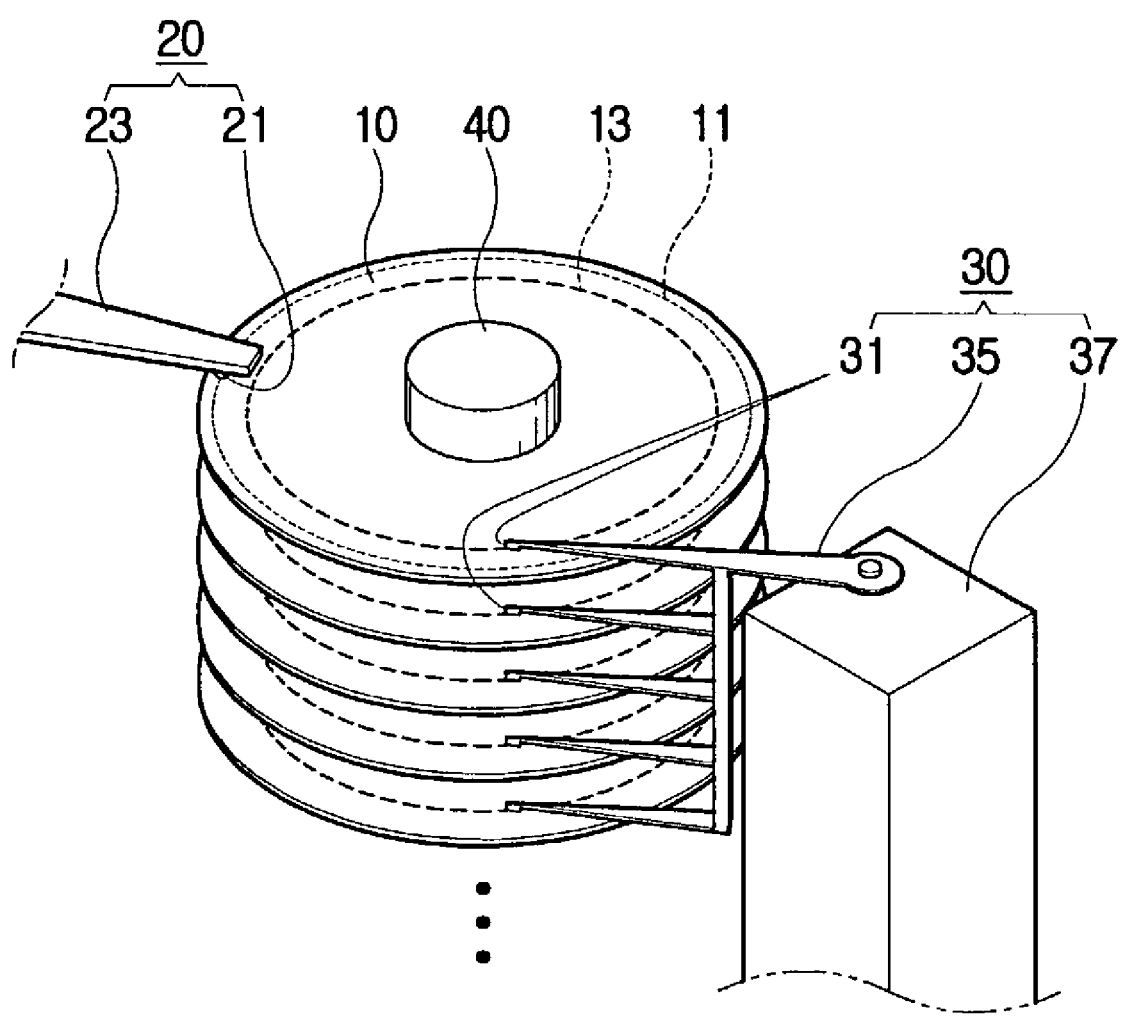
FIG. 2 is a schematic perspective view of a disk writer according to an embodiment of the present invention.
Figure 3:
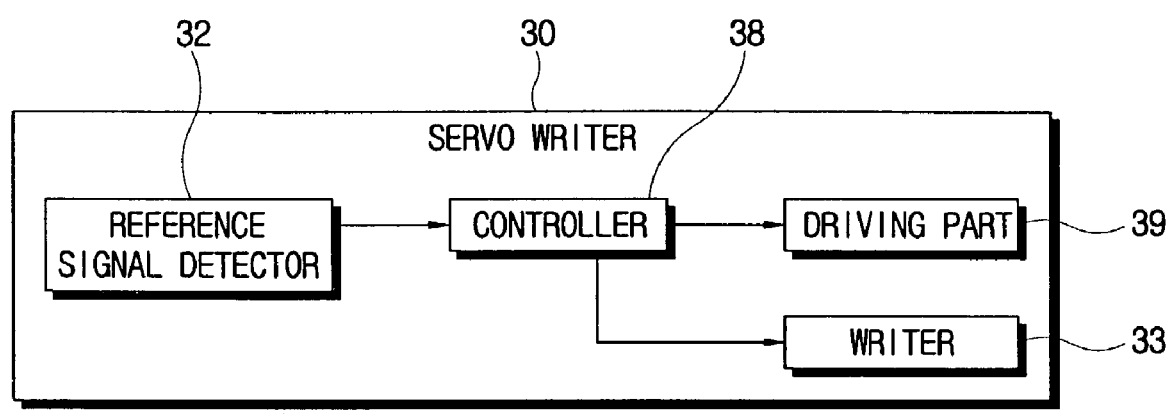
FIG. 3 is a schematic block diagram of a servo writer in the disk writer according to the present invention.

As shown in FIGS. 2 and 3, a disk writer according to an embodiment of the present invention comprises a reference signal writer 20 writing a reference signal on a disk 10 along a track at a predetermined distance from an edge of the disk 10 and a servo write 30, wherein the servo writer 30 includes a reference signal detector 32 detecting the reference signal written on the mask 10 and a writer 33 writing servo data on the disk 10 on the basis of the position where the reference signal is detected.

The plurality of disks 10 are spaced apart from each other and mounted to a rotation axle 40, and the rotation axle 40 is driven by an actuator (not shown) and rotates the disks 10.

The reference signal writer 20 writes the reference signal on the uppermost disk 10 among the plurality of disks 10. The reference signal writer 20 includes a reference signal head 21 writing the reference signal on the disk 10, and a reference head arm 23 supporting the reference signal head 21 stably in place.

The reference signal head 21 is provided on a first end of the reference head arm 23 and writes the reference signal on the uppermost disk 10.

The reference head arm 23 provided with the reference signal head 21 at the first end thereof has a second end connected to a casing (not shown) or a base (not shown) so as to stably keep the position of the reference signal head 21.

The reference signal writer 20 writes the reference signal on the disk 10 along the track at a predetermined distance from the edge of the disk 10. The distance from the edge of the disk 10 to a reference track 11 can be arbitrarily set up by a user. Herein, an error in the distance from the edge of the disk 10 to the reference track 11 is smaller than a predetermined moving range in which a head (not shown) of the HDD moves to seek a start track 13 at which a servo writing process is started. In other words, because the reference head arm 23 supports the reference signal head 21 stably without moving, the distance from the edge of the disk 10 to the reference track 11 is approximately constant during a reference signal writing process.

The servo writer 30 comprises a servo head 31 including the reference signal detector 32 and the writer 33, a servo writer arm 35 supporting the servo head 31, and a positioner 37 rotatably supporting the servo writer arm 35 and adjusting a position of the servo head 31 on the basis of the position where the reference signal is detected.

The reference signal detector 32 of the servo head 31 detects the reference signal written by the reference signal writer 20 on the uppermost disk 10 among the plurality of disks 10. The writer 33 of the servo head 31 is employed to write the servo data on every disk 10 on the basis of the position where the reference signal is detected. Herein, the number of servo heads 31 corresponds to the number of disks 10, and each servo head 31 includes the writer 33, thereby writing the servo data on each disk 10. However, the reference signal detector 32 is provided in only one servo head 31 reading the uppermost disk 10.

The servo writer arm 35 supports the plurality of servo heads 31, and is rotatable relative to the positioner 37.

The positioner 37 includes a controller 38 adjusting the respective positions of the servo heads 31 on the basis of the reference signal detected by the reference signal detector 32, and a driving part 39 rotating the servo writer arm 35 according to a control signal of the controller 38.

The controller 38 controls the servo head 31 to move in consideration of the reference track 11 within the predetermined moving range in which the head of the HDD moves to seek the start track 13 after the disks 10 are assembled into the HDD. Herein, the controller 38 controls the servo head 31 to move by a track unit on the basis of the reference track 11 so that the servo head 31 moves with little error. Therefore, when the servo head 31 detects the reference track 11, the positioner 37 drives the servo writer arm 35 to move from the reference track 11 to the position distant from the reference track 11 at a distance set up in the controller 38, thereby moving the servo head 31.

Figure 4:
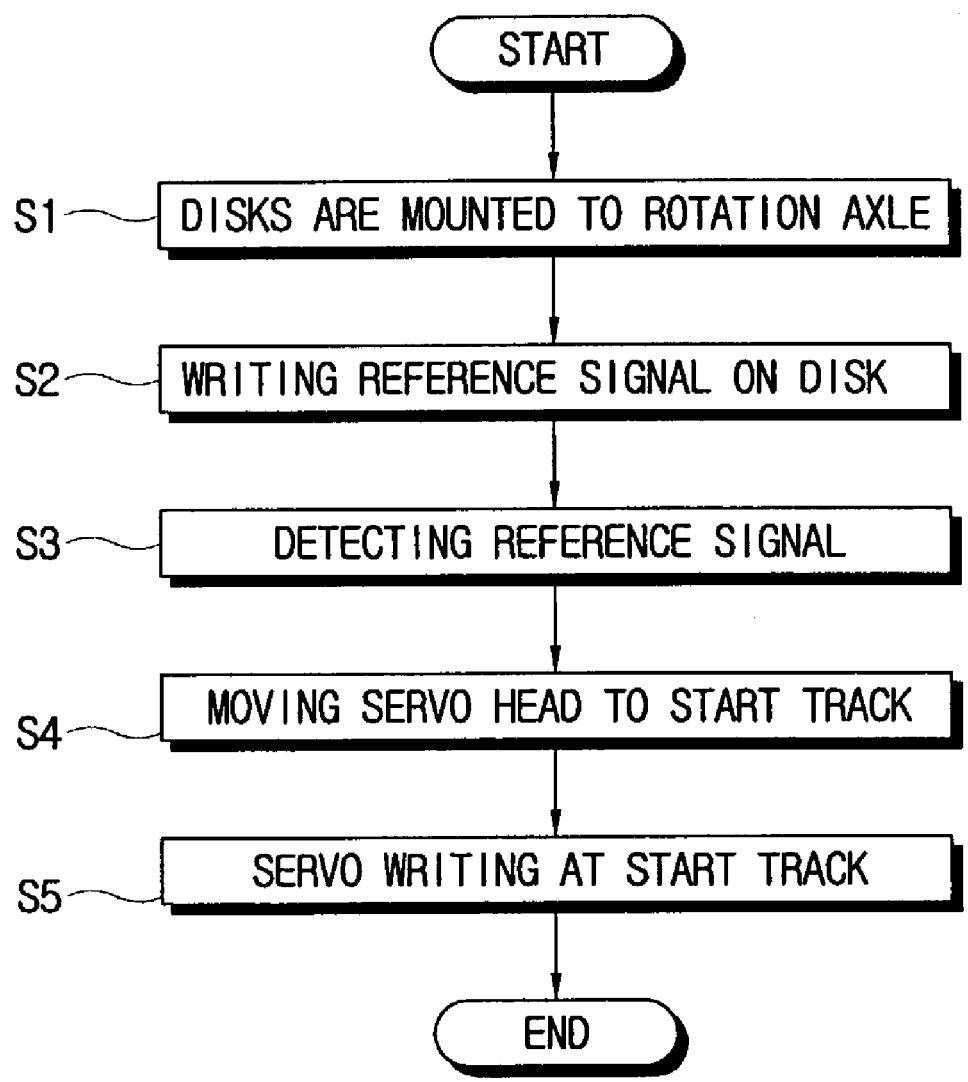
FIG. 4 is a flowchart showing operation of the disk writer according to the present invention.

With this configuration, the operation of the disk writer according to an embodiment of the present invention will be described with reference to FIG. 4.

First, the plurality of disks 10 is mounted to the rotation axle 40 (S1). Then, the reference signal writer 20 writes the reference signal on the uppermost disk 10 among the disks 10 (S2). Then, when the servo head 31 of the servo writer 30 detects the reference signal (S3), the positioner 37 of the servo writer 30 moves the servo head 31 by a distance set up in the controller 38 on the basis of the position where the reference signal is detected (S4). Then, the servo head 31 performs the servo writing process at the moved position, i.e., at the start track 13.

Thus, whenever the reference signal is written on the disk 10, the distance from the edge of the disk 10 to the reference track 11 does not vary. Herein, because the position of the start track 13 at which the servo writing process is performed is determined on the basis of the reference track 11, a positioning error of the start track 13 is decreased.

In the foregoing embodiment, the reference signal writer 20 writes the reference signal on the uppermost disk 10 among the plurality of disks 10. However, the reference signal writer 20 may write the reference signal on another disk 10 in lieu of the uppermost disk 10, and may write the reference signal on several disks 10.

In the foregoing embodiment, the reference signal is written on the disk 10 by the reference signal writer 20 so as to determine the position of the start track 13. A clock signal may be used as the reference signal, wherein the clock signal is written on the disk before the servo writing process and used for synchronization at the servo writing process.

As described above, the disk writer according to an embodiment of the present invention comprises a reference signal writer writing a reference signal on a disk along a track at a predetermined distance from an edge of the disk, keeping the predetermined distance constant; and a servo writer detecting the reference signal written on the disk, and writing servo data on the disk on the basis of the detected reference signal, so that a positioning error of a start track is decreased, thereby resulting in a superior HDD.

As described above, the embodiments of the present invention provide a disk writer and a writing method thereof, capable of minimizing a positioning error of a start track of an HDD.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A disk writer writing servo data on a disk for an HDD, comprising:
   a reference signal writer writing a reference signal on the disk along a track at a predetermined distance from an edge of the disk; and
   a servo writer, disposed apart from the reference signal writer, including a reference signal detector detecting the reference signal written on the disk, and a writer writing the servo data on the disk based upon a position where the reference signal is detected.

2. The disk writer according to claim 1, wherein the reference signal writer includes:
   a reference signal head writing the reference signal on the disk; and
   a reference head arm supporting the reference signal head stably in place.

3. The disk writer according to claim 1, wherein the servo writer includes:
   a servo head provided with the reference signal detector and the writer;
   a servo writer arm supporting the servo head; and
   a positioner rotatably supporting the servo writer arm and adjusting a position of the servo head based upon the position where the reference signal is detected.

4. The disk writer according to claim 3, wherein the reference signal written on the disk includes a clock signal.

5. The disk writer according to claim 2, wherein the servo writer includes:
   a servo head provided with the reference signal detector and the writer;
   a servo writer arm supporting the servo head; and
   a positioner rotatably supporting the servo writer arm and adjusting a position of the servo head based upon the position where the reference signal is detected.

6. The disk writer according to claim 5, wherein the reference signal written on the disk includes a clock signal.

7. The disk writer according to claim 2, wherein the reference signal head is provided on a first end of the reference head arm and writes the reference signal on the disk.

8. The disk writer according to claim 7, wherein the reference head arm has a second end connected to a base of the disk writer to stably maintain the reference signal head in position.

9. The disk writer according to claim 3, further comprising a controller positioned within the servo writer, wherein when the servo head detects the reference signal, the positioner moves the servo head by a distance set up in the controller on the basis of the position where the reference signal is detected.

10. The disk writer according to claim 9, wherein the servo head performs the servo writing process at the moved position.

11. The disk writer according to claim 10, wherein the moved position is a start track of the disk.

12. The disk writer according to claim 2, wherein the reference signal writer writes the reference signal on any selected one of plural disks aligned along a rotation axle to be assembled within an HDD.

13. A disk writer writing servo data on a plurality of disks each used for a hard disk drive (HDD), comprising:
   a reference signal writer writing a reference signal on one of the plurality of disks at one time along a track at a predetermined distance from an edge of the disk; and
   a servo writer, disposed apart from the reference signal writer, including reference signal detectors, one of the reference signal detectors detecting a position of the reference signal, and writers writing the servo data on a respective disk based upon the detected position.

14. The disk writer according to claim 13, wherein the servo writer includes:
   a servo head provided with each of the reference signal detectors and the writers;
   servo writer arms supporting each of the servo heads; and
   a positioner rotatably supporting the servo writer arms and adjusting a position of the servo heads based upon the detected position.

* * * * *